(12) United States Patent
Wray

(10) Patent No.: US 7,110,899 B2
(45) Date of Patent: Sep. 19, 2006

(54) PHASE MEASUREMENT IN MEASURING DEVICE

(75) Inventor: Troy Wray, Gloucestershire (GB)

(73) Assignee: ABB Limited, (GB)

( * ) Notice: Subject to any disclaimer, the term of this patent is extended or adjusted under 35 U.S.C. 154(b) by 126 days.

(21) Appl. No.: 10/856,009

(22) Filed: May 28, 2004

(65) Prior Publication Data

US 2005/0021259 A1 Jan. 27, 2005

(30) Foreign Application Priority Data

May 30, 2003 (GB) ................................ 0312471.6

(51) Int. Cl.
*G06F 19/00* (2006.01)
*G01F 1/84* (2006.01)

(52) U.S. Cl. ..................... 702/72; 702/45; 73/861.354; 73/861; 73/861.351

(58) Field of Classification Search ..................... None
See application file for complete search history.

(56) References Cited

U.S. PATENT DOCUMENTS

| | | | |
|---|---|---|---|
| 3,875,394 A | 4/1975 | Shapely | 235/181 |
| 4,192,184 A | 3/1980 | Cox et al. | 73/194 |
| RE31,450 E | 11/1983 | Smith | 73/861.38 |
| 4,422,338 A | 12/1983 | Smith | 73/861.38 |
| 4,567,486 A * | 1/1986 | Breiholz | 342/401 |
| 4,675,614 A * | 6/1987 | Gehrke | 327/3 |
| 4,856,346 A | 8/1989 | Kane | 73/861.38 |
| 5,394,758 A | 3/1995 | Wenger et al. | 73/861.38 |
| 5,423,221 A | 6/1995 | Kane et al. | 73/861.38 |
| 5,583,785 A * | 12/1996 | Hainey | 702/79 |
| 5,731,698 A * | 3/1998 | Fujii et al. | 324/76.77 |
| 5,808,462 A * | 9/1998 | Fujii et al. | 324/76.13 |
| 5,837,902 A * | 11/1998 | Veneruso et al. | 73/861.06 |
| 5,948,995 A * | 9/1999 | Veneruso et al. | 73/861.06 |
| 6,332,366 B1* | 12/2001 | Wray | 73/861.356 |
| 6,433,740 B1* | 8/2002 | Gilhousen | 342/442 |
| 6,794,857 B1* | 9/2004 | Toyoda et al. | 324/76.78 |
| 6,937,070 B1* | 8/2005 | Ishikawa et al. | 327/50 |
| 2003/0029249 A1* | 2/2003 | Keech | 73/861.12 |
| 2003/0029250 A1* | 2/2003 | Keech et al. | 73/861.17 |
| 2003/0057965 A1* | 3/2003 | Toyoda et al. | 324/617 |
| 2005/0048941 A1* | 3/2005 | McBurney | 455/258 |

FOREIGN PATENT DOCUMENTS

EP 0 846 936 10/1998

OTHER PUBLICATIONS

Search Report by the United Kingdom Application No.: 0312471.6 dated Aug. 31, 2004.

* cited by examiner

*Primary Examiner*—Patrick J. Assouad
(74) *Attorney, Agent, or Firm*—Ohlandt, Greeley, Ruggiero & Perle

(57) ABSTRACT

Methods and apparatus for determining the phase of a signal in a measurement device having a digital signal processor are described. The signal is digitised and the digitised signal, or a signal derived therefrom, is numerically correlated with a numerically generated reference signal. In one embodiment, the reference signal has a predetermined phase. In a further embodiment, the numerically generated reference signal has a reference phase and the phase is determined from the result of the correlation. The techniques described herein may reduce the amount of information lost in determining the signal phase.

28 Claims, 2 Drawing Sheets

PHASE MEASUREMENT IN MEASURING DEVICE

BACKGROUND OF THE INVENTION

1. Field of the Invention

The present invention relates to measuring devices, in preferred embodiments to electromagnetic flow meters or Coriolis mass flow meters. As used herein, the term "flow meter" is intended to encompass flow meters for measuring flow of a liquid.

2. Description of Related Art

Electromagnetic flow meters are well known in the art. Very briefly, in an electromagnetic flow meter one or more excitation coil(s) are arranged in or around a measurement duct for generating a magnetic field across the fluid flowing through the measurement duct. This causes electric charges within the fluid to be displaced transversely to the direction of the magnetic field and the direction of flow, which results in a potential difference between opposite sides of the measurement duct. This potential difference can be measured and provides an indication of the flow through the measurement duct.

In an AC electromagnetic flow meter (i.e. an electromagnetic flow meter whose coils are energised by an AC current) the measured signal will also generally be an AC signal.

Coriolis mass flow meters are known for example from U.S. Pat. Nos. 4,422,338, 5,423,221, 4,856,346, 5,394,758, 4,192,184 and U.S. re-issue Pat. No. 31450, the disclosures of each of which are herein incorporated by reference.

Briefly, in an AC Coriolis mass flow meter a measurement duct is caused to oscillate, for example by twisting the duct by means of AC electromagnetic excitation. This displacement of the measurement duct at various positions along the duct is indicative of mass flow through the measurement duct. The measured signal indicative of displacement will also generally be of AC nature.

In an AC Coriolis mass flow meter it is important to know the phase between the AC excitation and the measured signal since a measure of mass flow can be derived from the phase. In an electromagnetic flow meter phase sensitive detectors can be used to improve accuracy.

There are other instances in measuring devices where an accurate phase measurement or phase sensitive detection may be required.

In a conventional approach the phase is determined, using a zero-crossing technique. Another conventional approach employs peak detection. Phase locked loops may also be used.

Modern measuring devices often include a digital signal processor (DSP) for digitally generating an excitation signal, digitally filtering a measured signal and this can be used to carry out digital zero-crossing detection and peak detection.

BRIEF SUMMARY OF THE INVENTION

It has been appreciated by the present inventor that most of the information is lost if a zero-crossing or peak detection technique is employed.

The present invention provides a method of determining the phase of a signal in a measurement device having a digital signal processor, comprising digitising the signal;

numerically correlating the digitised signal or a signal derived therefrom with a numerically generated reference signal having a reference phase; and determining the phase from the result of the correlation.

Correlating the measured signal with a numerically generated reference signal not only has the advantage that, unlike in the zero-crossing and peak detection approaches, no information is lost, but also that rejection of other signal components may be surprisingly enhanced when compared with employing a measured reference signal such as a measured value of the current through the excitation coils (in the case of an electromagnetic flow meter). Surprisingly, the technique according to the present invention may enable more accurate measurements to be obtained than with a technique which employs zero-crossing or peak detection. This is so despite the fact that the reference signal used pursuant to the present invention is not representative of a "real signal".

If desired, the amplitude of the signal may be determined from the result of the correlation.

Preferably, the numerically generated reference signal comprises a sinusoidal signal.

Preferably, the digitised signal or a signal derived therefrom is numerically correlated with numerically generated first and second reference signals having a quadrature phase relation.

Preferably, the reference signal or, in the case of two or more reference signals at least one of them, has a predetermined phase.

Preferably, the reference signal or, in the case of two or more reference signals at least one of them, has the same frequency and phase as a further signal used for operating the measurement device.

Preferably, an estimate $N_L$ of the phase of the digitised signal is provided, wherein the reference signal or, in the case of two or more reference signals at least one of them, has the same frequency as a further signal used for operating the measurement device, and a phase corresponding to the estimated phase $N_L$. The estimate of the phase $N_L$ may be provided by calibrating the device.

The measurement device may be a flow meter, for example a Coriolis meter or an electromagnetic flow meter. In this case the further signal is preferably an AC excitation signal used for operating the flow meter.

In the case of a Coriolis meter a measure of flow rate is preferably determined based on said phase.

In a second aspect the invention provides a method of processing a signal in a measurement device having a digital signal processor, comprising digitising the signal; and numerically correlating the digitised signal or a signal derived therefrom with a numerically generated reference signal, wherein the reference signal has a predetermined phase.

Preferably, an estimate $N_L$ of the phase of the digitised signal is provided, wherein the reference signal has the same frequency as a further signal used for operating the measurement device, and a phase corresponding to the estimated phase $N_L$. The estimate of the phase $N_L$ may be provided by calibrating the device.

Preferably, the amplitude is determined from the result of the correlation.

Preferably, the measurement device is a flow meter, and a measure of flow rate is preferably determined based on said amplitude.

In a third aspect the invention provides a measurement device comprising means for digitising a signal;

means for numerically correlating the digitised signal or a signal derived therefrom with a numerically generated reference signal; and means for determining the phase of the signal from the result of the correlation.

In a fourth aspect the invention provides a measurement device comprising means for digitising a signal; and means for numerically correlating the digitised signal or a signal derived therefrom with a numerically generated reference signal having a predetermined phase.

In a fifth aspect the invention provides a computer program suitable for determining the phase of a signal in a measurement device having a digital signal processor, comprising computer code for digitising the signal;

computer code for numerically correlating the digitised signal or a signal derived therefrom with a numerically generated reference signal; and computer code for determining the phase from the result of the correlation.

In a sixth aspect the invention provides a computer program suitable for processing a signal in a measurement device having a digital signal processor, comprising computer code for digitising the signal; and computer code for numerically correlating the digitised signal or a signal derived therefrom with a numerically generated reference signal having a predetermined phase.

The invention also provides a computer program product comprising a computer readable medium which stores the computer program according to the fifth or sixth aspect.

Apparatus, computer program and computer program product aspects corresponding to the subordinate method aspects are also provided and preferred features of one aspect of the invention may be applied to other aspects.

BRIEF DESCRIPTION OF THE SEVERAL VIEWS OF THE DRAWINGS

Preferred features of the present invention will now be described, by way of example only, with reference to the accompanying drawings, in which.

DETAILED DESCRIPTION OF THE INVENTION

Figure 1:
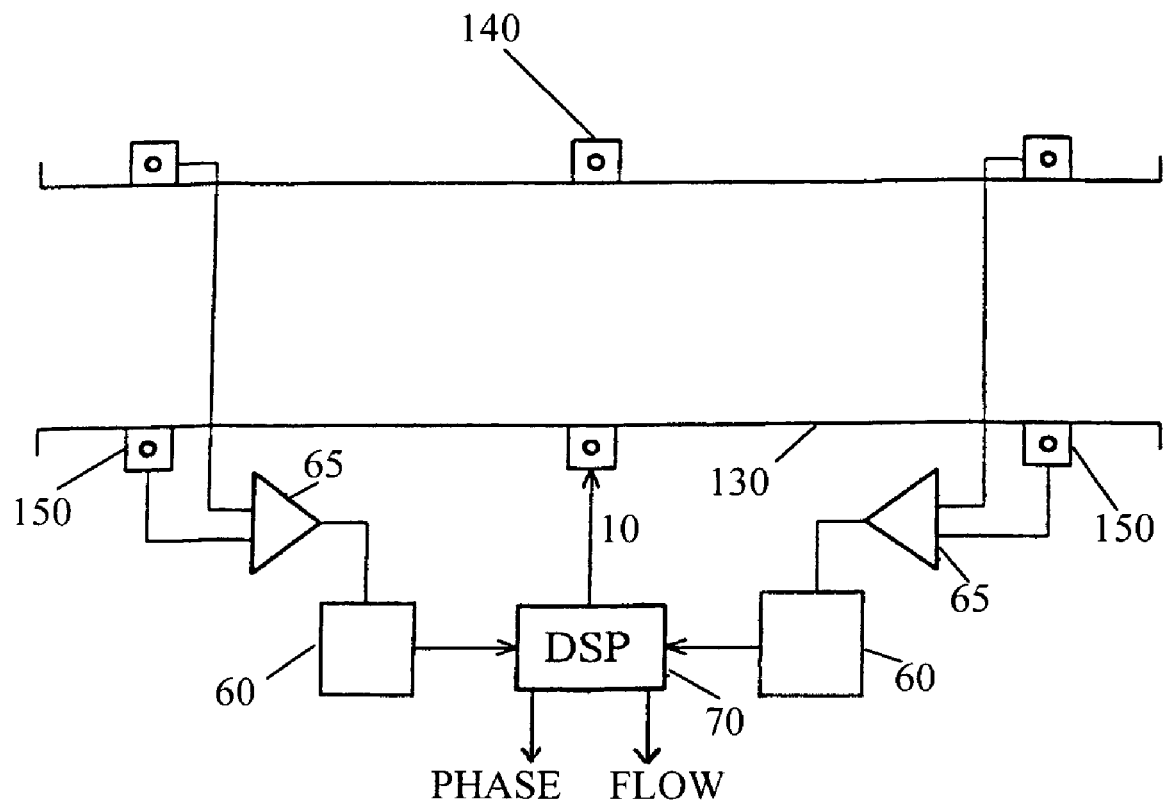
FIG. 1 schematically shows a Coriolis mass flow meter according to a first embodiment of the present invention.

As shown in FIG. 1, the Coriolis flow meter according to the first embodiment comprises a measurement duct 130 through which for example a liquid flows. The duct is firmly fixed at both ends with respect to fixed structure. A twisting mechanism 140, preferably arranged at the middle of the duct, twists the duct in oscillating fashion. Twisting mechanism 140 is controlled by digital signal processor (DSP) 70, which generates a digital representation 10 of a sinusoidal signal of frequency T. A power amplifier (not shown) may be provided for amplifying an output of the DSP 70 generated by a digital to analogue converter (DAC) integrated in the DSP 70 or separate. The power amplifier may be redundant or integrated into the DSP 70 depending on power requirements and DSP drive capability.

The twisting action of twisting mechanism 140 causes duct 130 to oscillate about its axis over its entire length, although the angular displacement is generally smaller towards the ends than towards the middle. The angular displacement of the measurement duct 130 can be measured at various positions. In the example shown two displacement sensors 150 are shown, but in principle the invention can be carried out with only one displacement sensor. Likewise, further displacement sensors can be added along the measurement duct.

The displacement as sensed by displacement sensor 150 is passed to DSP 70 after analogue to digital conversion in ADC 60. The Analogue to digital converter 60 may be integrated into the DSP 70. Optionally, the sensed signal may be amplified in amplifier 65. DSP 70 correlates the digital representation of the measured displacement signal with the reference signal 10 so as to provide as an output the flow rate through measurement duct 130 and optionally also the phase of the measured displacement signal with respect to the reference signal 10.

The correlation technique will now be described. The digital representation of the measured signal may be assumed to be a sinusoidal signal A(t) of amplitude A, frequency T (which equals the frequency of the excitation signal) and unknown phase N, hence $$A(t)=A\sin(Tt+N). \tag{Equation 1}$$

The following two integrals are used in the correlation:

$$C_S = \int A(t)\sin Tt\, Mt, \text{ and} \tag{Equation 2}$$

$$C_C = \int A(t)\cos Tt\, Mt, \tag{Equation 3}$$

whereby the sin Tt and cos Tt signals used in the correlation are numerically generated by DSP 70.

The integrals result in $$C_S = \tfrac{1}{2}(A\cos N) \tag{Equation 4}$$

$$C_C = \tfrac{1}{2}(A\sin N). \tag{Equation 5}$$

$C_S$ and $C_C$ can be obtained through numerical integration in DSP 70. Division of Equation 5 by Equation 4 immediately leads to $$\tan N = C_C/C_S, \tag{Equation 6}$$

from which the phase N can immediately be calculated.

Once the phase N is known a measure of the flow can be calculated, as is known in the art.

If desired, the amplitude A can also be calculated by forming the squares of Equations 4 and 5, adding these and then forming the square root (N.B. $\sin^2+\cos^2=1$). This leads to $$A = 2\,\mathrm{sqrt}(C_S^2 + C_C^2). \tag{Equation 7}$$

In a Coriolis meter this may be used for example for controlling the amplitude of the signal which drives twisting mechanism 140.

Figure 2:
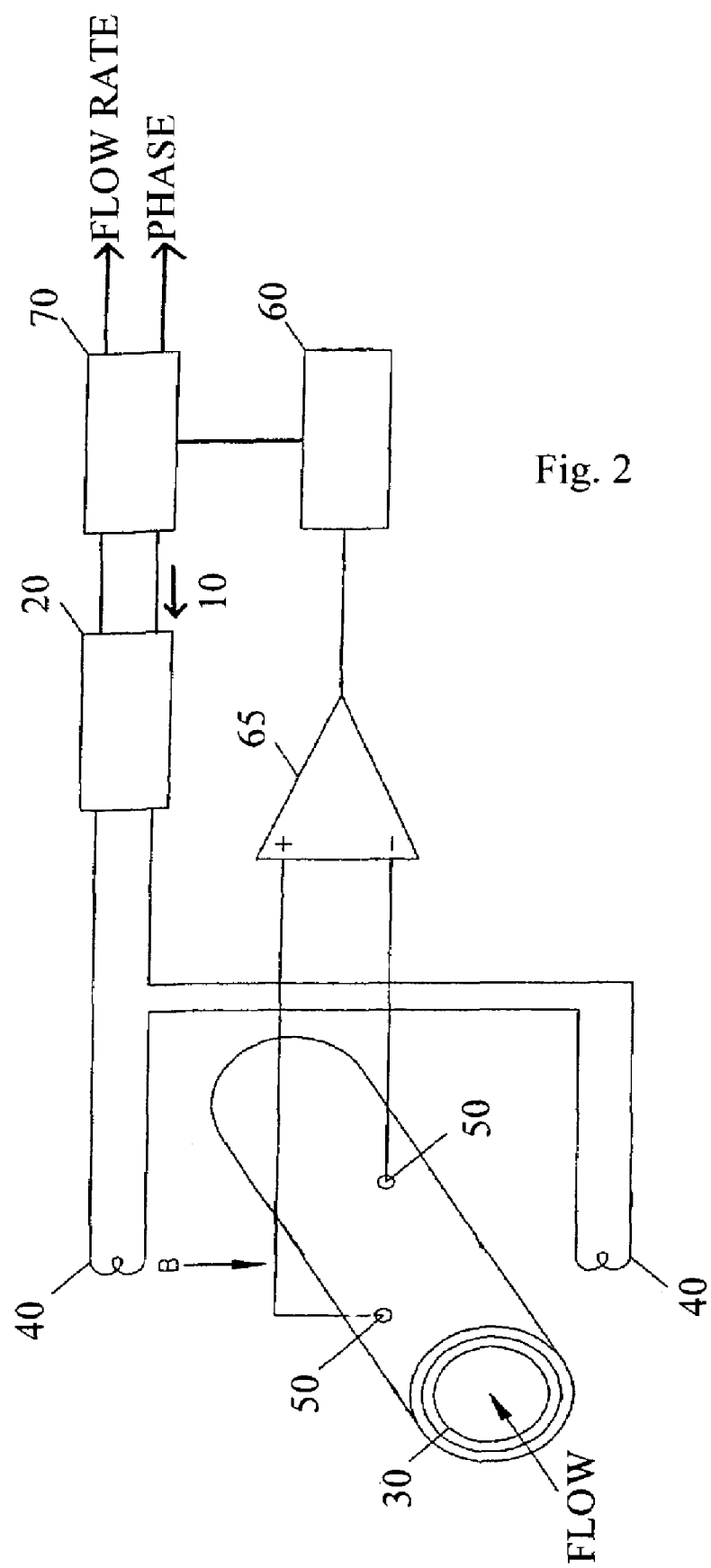
FIG. 2 schematically shows an electromagnetic flow meter according to a second embodiment of the present invention.

As shown in FIG. 2, the electromagnetic flow meter according to the second embodiment also comprises a DSP 70, a current source 20 and an ADC 60, which perform the same or corresponding functions as in the first embodiment.

The electromagnetic flow meter according to the second embodiment comprises a measurement duct 30 through which for example a liquid flows. An AC magnetic field B is generated by field generating coils 40, which are energised by current from amplifier 20. Digital signal processor (DSP) 70 generates a digital control signal 10, which is amplified by amplifier 20 so as to drive the coils 40. As in the first embodiment, amplifier 20 may be redundant or integrated into DSP 70.

The potential difference within the measurement duct 30 is sensed by sensing electrodes 50 arranged in or on the walls of the measurement duct 30. The sensed signal is passed to the DSP 70 after analogue to digital conversion in ADC 60 and optionally amplification by amplifier 65. DSP 70 correlates the digital representation of the sensed signal of the potential difference within the measurement duct 30 with the signal 10. DSP 70 outputs a value indicative of the flow rate through the measurement duct 30, and optionally also the phase N.

The correlation processing in the second embodiment may be performed in analogy with the correlation processing described in the first embodiment, although in the case of an electromagnetic flowmeter in an electromagnetic flowmeter it is the amplitude A of the measured signal which is directly representative of flow rate, and not the phase N. Hence by providing A as an output (if necessary after multiplication with an appropriate scaling factor) an indication of flow rate is provided.

The amplitude A (a measure of flow rate) can be calculated according to Equation 7.

A first development of the above technique is based on the appreciation that for some measuring devices an estimate of the phase between an excitation signal and the measured signal can be used in the correlation, which may improve measurement accuracy. Taking an electromagnetic flowmeter as an example, the voltage sensed by sensing electrodes 50 will normally lag by a small amount behind the excitation signal which energises coils 40 (which in turn should be in phase with control signal 10). The phase $N_L$ corresponding to this lag can be estimated for example by carrying out a calibration run, or by a zero-crossing or peak detection method. Note that the advantages of the present invention are not lost by using zero-crossing or peak detection here. They are used merely to provide an estimate of the phase $N_L$.

Once the phase $N_L$ has been estimated the correlation is carried out in accordance with the principles of the present invention. To this end the terms sinTt and cosTt are replaced by $\sin(Tt-N_L)$ and $\cos(Tt-N_L)$. The result of this is that the sensed signal is correlated with a (numerically generated) signal having approximately the same phase as the sensed signal. This may improve rejection of unwanted signal components, in particular signal components which have a quadrature phase relationship with the wanted signal.

Since the sensed signal is now (approximately) in phase with the numerically generated control signal the integral of Equation 3 will result in $C_C$=0 (or approximately 0). The phase can nevertheless be calculated according to Equation 6. This should again result in a value of approximately 0, and hence any significant deviation from this value may be interpreted as being caused by spurious signals, or as a fault.

If precise knowledge of the phase of the sensed signal is not required the calculation of the phase may be omitted. Indeed, it is then sufficient only to integrate according to Equation 2, but not according to Equation 3. This means that generation of only one reference signal (in this case a sinTt signal) is sufficient.

As mentioned above, in the case of an electromagnetic flowmeter the amplitude of the sensed signal provides an indication of flow rate, whereas the phase does not. In this case it may still be advantageous to estimate the phase $N_L$, because the correlation can then be carried out with a reference signal having approximately the same phase as the sensed signal. The amplitude of the sensed signal is again calculated according to Equation 7.

In a second modification neither the phase nor the amplitude is calculated. This modification is nevertheless based on the same principles as the above techniques of determining the phase and/or amplitude. According to this further modification, the correlation is performed with a reference signal of known phase. The phase of the reference signal should be chosen so as to be (approximately) the same as the phase of the sensed signal. The phase of the sensed signal is estimated, for example by means of a calibration run, or can be determined using a look-up table (in the case of an electromagnetic flowmeter of known configuration the phase of the sensed signal associated with a particular excitation frequency and excitation current amplitude can usually be calculated in advance, and the results of the calculation can be stored in a memory for future reference). Correlating with a reference signal whose phase is (approximately) the same as the phase of the sensed signal effectively results in phase-sensitive detection of the sensed signal.

With such phase-sensitive detection Equation 5 again becomes $C_C$=0, whereas Equation 4 becomes the maximum value, i.e. $C_S$=½A. Again, optimum rejection of unwanted signals having a quadrature phase relationship with the wanted signal can be achieved.

In an electromagnetic flowmeter a lag (i.e. a phase difference) between the excitation signal and a signal to be sensed is caused partially by a finite response time of the flowmeter coil, so maximum field lacks maximum current, and also by unwanted signal components which are in phase quadrature with the wanted components. These may for example be caused by eddy currents (e.g. in the sensing electrodes 50) having a phase of approximately 90E with respect to the wanted signal.

In order to estimate the phase between the sensed signal with respect to an excitation signal both the finite response time and the quadrature phase signal components should be taken into account. The contribution due to eddy currents can be determined in a calibration run, i.e. at zero flow or with an empty pipe, and the results can be stored so that they can be taken into account in non-zero flow measurements.

The contribution to the phase due to the coil response can then be determined in further calibration runs, at non-zero flow. Calibration at different (known) flow rates enables various phases to be determined (e.g. as described above according to Equations 2 to 6). Once a sufficient number of calibrations has been carried out a look-up table can be generated which links a particular excitation frequency and amplitude of excitation current to an expected phase of a measured signal with respect to the excitation current.

With the phase thus estimated, phase sensitive detection can be carried out.

While the present invention has been described in its preferred embodiments, it is to be understood that the words which have been used are words of description rather than limitation and that changes may be made to the invention without departing from its scope as defined by the appended claims.

Each feature disclosed in this specification (which term includes the claims) and/or shown in the drawings may be incorporated in the invention independently of other disclosed and/or illustrated features.

The invention claimed is:

1. A method of determining the phase of a signal in a coriolis flowmeter having a digital signal processor, comprising
    digitising the signal;
    numerically correlating the digitised signal or a signal derived therefrom with a numerically generated reference signal having a reference phase; and
    determining the phase from the result of the correlation.

2. A method according to claim 1, further comprising determining the amplitude of the signal from the result of the correlation.

3. A method according to claim 1, wherein the numerically generated reference signal comprises a sinusoidal signal.

4. A method according to claim 1, wherein numerically correlating the digitised signal or a signal derived therefrom comprises numerically correlating the digitised signal or a signal derived therefrom with numerically generated first and second reference signals having a quadrature phase relation.

5. A method according to claim 1, wherein the reference signal or, in the case of two or more reference signals at least one of them, has a predetermined phase.

6. A method according to claim 1, wherein the reference signal or, in the case of two or more reference signals at least one of them, has the same frequency and phase as a further signal used for operating the coriolis flowmeter.

7. A method of processing a signal in a coriolis flowmeter having a digital signal processor comprising
digitising the signal; and
numerically correlating the digitised signal or a signal derived therefrom with a numerically generated reference signal, wherein the reference signal has a predetermined phase.

8. A method according to claim 7, further comprising determining the amplitude from the result of the correlation and determining a measure of flow rate based on said amplitude.

9. A method according to claim 1, further comprising providing an estimate $\phi_L$ of the phase of the digitised signal, wherein the reference signal or, in the case of two or more reference signals at least one of them, has the same frequency as a further signal used for operating the coriolis flowmeter, and a phase corresponding to the estimated phase $\phi_L$.

10. A method according to claim 9, comprising calibrating the coriolis flowmeter so as to estimate the phase $\phi_L$.

11. A method according to claim 6 wherein the coriolis flowmeter is a flow meter and wherein the further signal is an AC excitation signal used for operating the coriolis flow meter.

12. A method according to claim 10, further comprising determining a measure of flow rate based on said phase.

13. A coriolis flowmeter comprising
means for digitising a signal;
means for numerically correlating the digitised signal or a signal derived therefrom with a numerically generated reference signal; and
means for determining the phase of the signal from the result of the correlation.

14. A coriolis flowmeter according to claim 13, further comprising means for determining the amplitude of the signal from the result of the correlation.

15. A coriolis flowmeter according to claim 13, wherein the correlating means is arranged to correlate the digitised signal or a signal derived therefrom with a numerically generated sinusoidal reference signal.

16. A coriolis flowmeter according to claim 13, wherein the correlating means is arranged to correlate the digitised signal or a signal derived therefrom with numerically generated first and second reference signals having a quadrature phase relation.

17. A coriolis flowmeter according to claim 13, wherein the correlating means is arranged to correlate the digitised signal or a signal derived therefrom with a numerically generated reference signal having a predetermined phase.

18. A coriolis flowmeter according to claim 13, wherein the correlating means is arranged to correlate the digitised signal or a signal derived therefrom with a numerically generated reference signal having the same frequency and phase as a further signal to be used for operating the coriolis flowmeter.

19. A coriolis flowmeter comprising
means for digitising a signal; and
means for numerically correlating the digitised signal or a signal derived therefrom with a numerically generated reference signal having a predetermined phase.

20. A coriolis flowmeter according to claim 19, further comprising means for determining the amplitude of the signal from the result of the correlation, wherein the coriolis flowmeter comprises a flow meter and further comprises means for determining a measure of flow rate based on said amplitude.

21. A coriolis flowmeter according to claim 13, further comprising means for providing an estimate $\phi_L$ of the phase of the digitised signal, wherein the correlating means is arranged to correlate the digitised signal or a signal derived therefrom with a numerically generated reference signal having the same frequency as a further signal used for operating the coriolis flowmeter, and a phase corresponding to the estimated phase $\phi_L$.

22. A coriolis flowmeter according to claim 21, wherein the means for providing an estimate $\phi_L$ comprises means for calibrating the coriolis flowmeter.

23. A coriolis flowmeter according to claim 17, wherein the further signal is an AC excitation signal to be used for operating the coriolis flow meter.

24. A computer readable medium for storing a computer program suitable for determining the phase of a signal in a coriolis flowmeter having a digital signal processor, comprising
computer code for digitising the signal;
computer code for numerically correlating the digitised signal or a signal derived therefrom with a numerically generated reference signal; and
computer code for determining the phase from the result of the correlation.

25. A computer readable medium for storing a computer program suitable for processing a signal in a coriolis flowmeter having a digital signal processor, comprising
computer code for digitising the signal; and
computer code for numerically correlating the digitised signal or a signal derived therefrom with a numerically generated reference signal having a predetermined phase.

26. A method of determining the phase of a signal in a measurement device having a digital signal processor, comprising
digitising the signal;
numerically correlating the digitised signal or a signal derived therefrom with a numerically generated reference signal having a reference phase;
determining the phase from the result of the correlation;
providing an estimate $\phi_L$ of the phase of the digitised signal, wherein the reference signal or, in the case of two or more reference signals at least one of them, has the same frequency as a further signal used for operating the measurement device, and a phase corresponding to the estimated phase $\phi_L$;
calibrating the device so as to estimate the phase $\phi_L$; and
determining a measure of flow rate based on said phase.

27. A measurement device comprising
means for digitising a signal;
means for numerically correlating the digitised signal or a signal derived therefrom with a numerically generated reference signal; and
means for determining the phase of the signal from the result of the correlation;
means for providing an estimate $\phi_L$ of the phase of the digitised signal, wherein the correlating means is arranged to correlate the digitised signal or a signal derived therefrom with a numerically generated reference signal having the same frequency as a further signal used for operating the coriolis flowmeter, and a phase corresponding to the estimated phase $\phi_L$.

28. A measurement device according to claim 27, wherein the means for providing an estimate $\phi_L$ comprises means for calibrating the coriolis flowmeter.

* * * * *